United States Patent Office 3,307,406
Patented Mar. 7, 1967

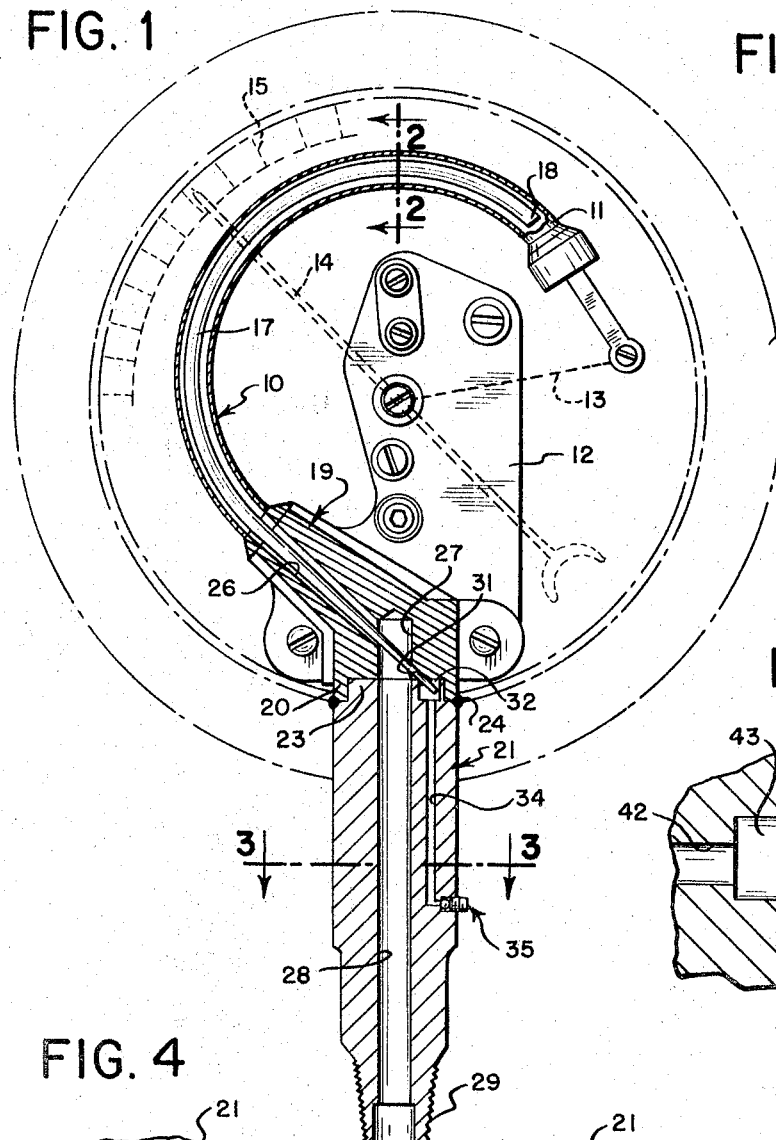

3,307,406
BOURDON PRESSURE GAGE
Robert P. Oliver, Milford, and Francis L. Fahy, Trumbull, Conn., assignors to American Chain & Cable Company, Inc., New York, N.Y., a corporation of New York
Filed Jan. 21, 1965, Ser. No. 427,038
4 Claims. (Cl. 73—418)

This invention relates to Bourdon pressure gages having a bleed tube within the Bourdon tube and, more particularly, to improved means for supporting and providing access to the bleed and Bourdon tubes.

In the typical Bourdon tube pressure gage, a hollow gage stem under the influence of the pressure being sensed supports and communicates with the interior of a flexible Bourdon tube with the tube and the stem together defining a configuration similar to a question mark. The free outer end of the Bourdon tube moves in response to changes in pressure to displace a pointer over a dial by means of a suitable linkage. It has been recognized that when the fluid within the Bourdon tube is a liquid it is advantageous to provide bleeding means for drawing off entrapped air as the tube fills with the liquid. If an air pocket were to remain in the tube during operation it tends to dampen the incompressible liquid subjected to the pressure in question and cause a sluggish response in measurement. Also, the bleeding means may be used prior to installation of the gage for flushing liquid through the Bourdon tube to cleanse it of contaminating particles such as scale.

A common form of such bleeding means has been a bleed tube of capillary size which is open at a first end outside the stem and which extends through the stem wall into its interior and thence through the Bourdon tube to a second open end within the movable extremity of the Bourdon tube. Some form of valve means has been provided on the exposed first end of the bleed tube outside the stem to provide controlled access for fluid flow into and out of the bleed tube. These bleed tube designs suffer from the disadvantage that a pressure drop exists across the thin wall of the bleed tube at its exposed outer end on the outside of the stem which is equal to the differential in pressure between the media being measured and the ambient pressure around the gage. As a result, there is a marked tendency for the bleed tube to be blown out of position by the greater pressure within the system of the gage. A bleed tube of capillary size is not capable of withstanding such pressure in many instances because of the thinness of its wall, nor is the joint between the bleed tube and the wall of the stem adaptable to a high pressure seal. This joint is preferably silver soldered or press-fitted and neither technique constitutes a barrier against great pressure differentials. It is impractical to resort to a stronger welded connection between the lower part of the bleed tube and the hole in the stem wall through which it extends because welding tends to burn through the thin-walled capillary bleed tube.

One of the primary features of the present invention is that it eliminates any pressure drop across the wall of the bleed tube or across the joint between the bleed tube and the stem. Consequently, there is no danger of collapsing the bleed tube under pressure or of blowing it out of its seat. Also, silver soldering or press-fitting is suitable for securing the bleed tube in place where it projects through the wall of the stem and no recourse to impractical welds on the thin-walled bleed tube is necessary. This is achieved by a novel two-piece construction for the gage stem which provides a truly all welded barrier wherever a system-to-atmosphere pressure drop is present. At the same time, the particular form of the welded two-piece stem is optimum from the standpoint of cost and it presents a pleasing appearance in the finished assembly.

Broadly stated the invention is directed to a Bourdon pressure gage wherein an open-ended bleed tube extends from within a movable end portion of a Bourdon tube to and out of a fixed end portion thereof. The improvement comprises a first stem element to which the fixed end portion of the Bourdon tube is attached and sealed. A second stem element is also provided to which the first stem element is attached and sealed remote from the Bourdon tube. The first and second stem elements define primary bores communicating with one another and the interior of the Bourdon tube and adapted in the second stem element to communicate with the pressure to be sensed. The bleed tube extends within the primary bore in the first stem element and projects in supporting engagement through the wall thereof into communication with a secondary bore defined by the second stem element. Valve means in the secondary bore permits controlled fluid flow therethrough from the bleed tube to atmosphere.

By this construction the pressure of the media being sensed is transmitted from the primary bores and the Bourdon tube through the bleed tube to the secondary bore. As a result the pressure on the inside and outside of the bleed tube is equal both in the primary bore of the stem and on the other side of the stem wall in the secondary bore. The support for the bleed tube in the stem wall between the primary and secondary bores is therefore subjected to no pressure differential and thus silver soldering or press fitting suffices for the support. On the exterior of the stem the two-piece welded construction is scarcely apparent in the finished device, yet separate access is provided to both the Bourdon and bleed tubes.

Preferred embodiments of the invention are described hereinbelow with reference to the accompanying drawing, wherein:

FIG. 1 is an elevation in section of the gage stem and Bourdon tube with the other parts of the gage assembly shown schematically;

FIG. 2 is an enlarged section taken along the line 2—2 of FIG. 1;

FIG. 3 is an enlarged section taken along the line 3—3 of FIG. 1;

FIG. 4 is an enlarged fragmentary section of the valved access means permitting controlled fluid flow through the bleed tube;

FIG. 5 is a fragmentary section taken along the line 5—5 of FIG. 4; and

FIG. 6 is an enlarged fragmentary section showing an alternate form of the valved access means.

Referring to FIG. 1, the pressure gage assembly includes a highly flexible Bourdon tube 10 having a movable outer end portion 11. A bracket 12 supports a linkage mechanism indicated schematically at 13 by which motion of the outer end 11 of the Bourdon tube can be made to move a pointer 14 across the face of a dial 15. As the pressure within the Bourdon tube 10 increases, the curved Bourdon tube increases in radius and its outer end 11 moves to actuate the gage pointer 14 in the usual manner. A housing 16 encloses the Bourdon tube 10, the linkage 13, pointer 14 and dial 15.

A small diameter or "capillary" bleed tube 17 is located within the Bourdon tube 10 as shown in FIGS. 1 and 2. The bleed tube 17 has a first open end 18 adjacent the movable end 11 of the Bourdon tube and it extends through the curved portion of the Bourdon tube to and out of the opposite end thereof. In some instances the bleed tube 17 may rest on the inner wall of the Bourdon tube 10 and if such engagement interferes with the proper calibration of the gage it is advantageous to make the bleed tube 17 of polytetrafluroethylene or other highly pliable material. Generally, however, the bleed tube 17 may be made of metal.

In accordance with the invention, improved means are provided for supporting and permitting separate access to both the Bourdon tube 10 and the bleed tube 17. A first stem element 19 is provided to which the fixed end portion of the Bourdon tube opposite its movable end 11 is attached and sealed, preferably by welding. The first stem element 19 also supports the bracket 12. Near the lower portion of the gage, the first stem element is formed with an annular flange 20. A second stem element 21 is formed with a boss 23 which is inserted snugly within the flange 20 on the first stem element 19. The first and second stem elements are attached by means of a peripheral weld 24 extending continuously around the outside of the joint between the flange 20 of the first stem element 19 and the shoulder around the boss 23 on the second stem element 21.

The first and second stem elements 19 and 21 define primary bores 26, 27 and 28 communicating with one another and with the interior of the Bourdon tube 10. In the second stem element 21, the portion 28 of the primary bore terminates at a threaded end 29 adapted to be seated in the member enclosing the media which is to be the subject of the pressure measurement. This threaded end 29 and the greater part of the second stem element 21 project downwardly from the bottom of the housing 16 of the gage.

The bleed tube 17 extends out of the fixed end of the Bourdon tube 10 and into the angled portion 26 of the primary bore. At its lower end, the bleed tube 17 extends out of the primary bore portion 26 and across the primary bore portion 27 in the first stem element 19 into a hole 31 drilled in the wall of the primary bore portion 27. As described below, the lower end of the bleed tube 17 may be silver soldered or press-fitted in the hole 31 and it is at this point that the bleed tube is supported.

The extreme end of the bleed tube 17 projects still further out of the hole 31 in the first stem element 19 into a small cavity 32 formed in the top of the boss 23 on the second stem element 21. A secondary bore 34 extends downwardly within the second stem element 21 from the cavity 32 to a region well below the lowermost part of the gage housing 16 as shown in FIGS. 1 and 3. Valve means 35 are located in this secondary bore 34 to permit controlled fluid flow therethrough from the bleed tube 17 to atmosphere. One form of valve means is shown in FIGS. 4 and 5 to include a passage 36 connecting with the secondary bore 34. The passage 36 is provided with an enlarged portion 37 in which is threaded a screw fitting 38. A ball valve member 39 is positioned across the passage 36 in its enlarged portion 37 and by turning the screw fitting 38 into and out of its seat the ball valve member 39 may be made to close and open the passage 36. Extending longitudinally through the screw fitting 38 is a central conduit 40 for transmitting fluid flow into and out of the passage 36 when the ball valve member 39 is removed from its seat. The outer end of the screw fitting 38 may be hexagonal as shown in FIG. 5 to facilitate its adjustment. In FIG. 6 an alternate form of the valve means is shown to include a passage 42 connecting with the secondary bore 34. The passage 42 again has an enlarged portion 43 but a grease fitting 44 is threaded into it to permit fluid flow into but not out of the passage 42. This is useful in flushing out the gage prior to use to eliminate contaminating material.

In a gage of this construction the two elements of the stem can be welded together so tightly that they appear to be unitary. The system subjected to pressure within the gage, comprising the primary bores 26, 27 and 28, the Bourdon tube 10, the bleed tube 17, the cavity 32 and the secondary bore 34, is sealed by the valve means 35 and hence the bleed tube 17 is subjected to equal pressure throughout its length both interiorly and exteriorly. As a consequence, the support for the bleed tube 17 in the hole 31 in the first stem element 19 may be silver soldered or press-fitted without concern for stresses from fluid pressure. The thin-walled bleed tube 17 is therefore called upon only to transmit fluid flow, which is what it is designed to do, and not to bear differential pressure.

We claim:

1. In a Bourdon pressure gage wherein an open-ended bleed tube extends from within a movable end portion of a Bourdon tube to and out of a fixed end portion thereof, the improvement which comprises
   (a) a first stem element to which the fixed end portion of the Bourdon tube is attached and sealed;
   (b) a second stem element to which the first stem element is attached and sealed remote from the Bourdon tube,
      (i) at least one of said first and second stem elements defining primary bore means communicating with the interior of the Bourdon tube and adapted to communicate with the pressure to be sensed.
      (ii) said bleed tube extending within the primary bore in the first stem element and projecting in supporting engagement through the wall thereof into communication with a secondary bore defined by the second stem element; and
   (c) valve means in said secondary bore permitting controlled fluid flow therethrough from the bleed tube to atmosphere.

2. A Bourdon pressure gage according to claim 1 wherein the first and second stem elements are attached by a continuous exterior weldment.

3. A Bourdon pressure gage according to claim 2 wherein the bleed tube projects in soldered supporting engagement through the wall of the primary bore in the first stem element.

4. A Bourdon pressure gage according to claim 2 wherein the bleed tube projects in press-fitted supporting engagement through the wall of the primary bore in the first stem element.

References Cited by the Examiner
UNITED STATES PATENTS
1,322,463   11/1919   Nelson _____ 73—411

LOUIS R. PRINCE, *Primary Examiner.*

DONALD O. WOODIEL, *Assistant Examiner.*